United States Patent Office 2,697,186
Patented Dec. 14, 1954

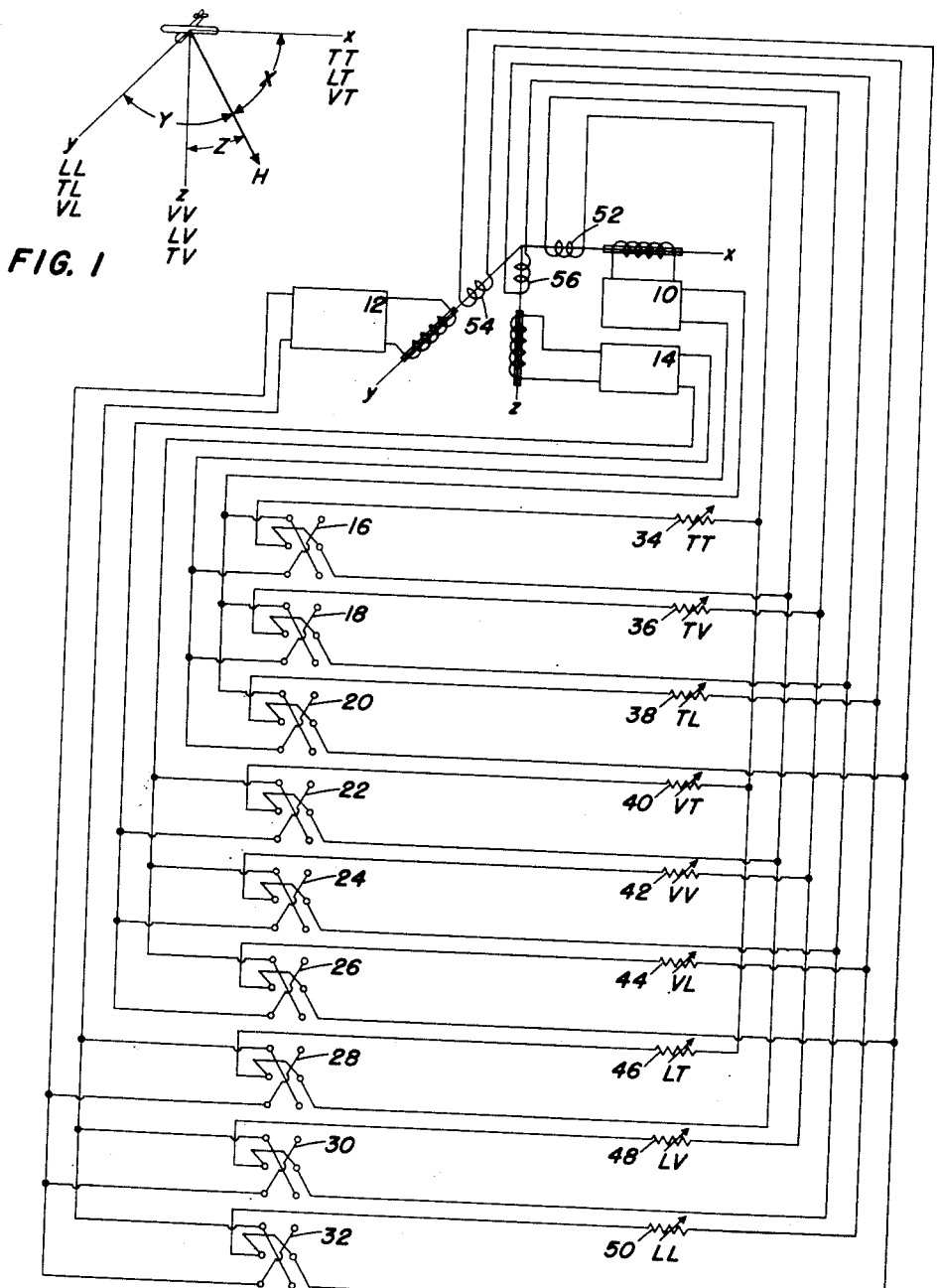

2,697,186

COMPENSATOR FOR INDUCED MAGNETIC FIELDS

Wilmer C. Anderson, Douglaston, N. Y., assignor to the United States of America as represented by the Secretary of the Navy Application July 31, 1944, Serial No. 547,449

1 Claim. (Cl. 317—123)

This case relates to compensators for induced magnetic fields, and more particularly to means for compensating magnetic fields induced in the structures of aircraft.

When instruments which depend for their operation upon the measurement of magnetic fields or which are affected by the presence of magnetic fields are installed in an aircraft, unsatisfactory operation may result due to fields induced in soft ferromagnetic members included in the aircraft structure.

In certain instances, the total induced field is due either predominantly or wholly to an assemblage of ferro magnetic members of known orientation, and in these cases it is relatively simple to set up an opposing field varying in the same sense as the induced field to compensate the latter. In the more usual case, however, the induced magnetic field of an aircraft is due to a plurality of members having more or less random distribution and orientations. In these cases, compensation through the use of an opposing field obviously cannot be effected by a simple procedure in accordance with which the fields due to individual members are compensated separately. It is an object of the present invention to provide means whereby the total induced field of an aircraft may be compensated without necessitating previous knowledge of the orientation of each contributing ferromagnetic member.

There is proposed in accordance with the present invention, therefore, a compensator for the induced magnetic field of an aircraft comprising means for measuring components of the earth's magnetic field in three mutually perpendicular directions in respect to the aircraft, means for producing voltages proportional to the measured components, coils arranged to produce magnetic fields in each of the directions, and means for applying currents proportional to each of the voltages in individually adjustable amplitude and polarity to each of the coils.

For a better understanding of the invention, reference is made to the accompanying drawings in which:

Fig. 1 is a diagram showing a reference system by means of which the orientation of the aircraft in relation to the earth's magnetic field may be determined; and Fig. 2 is a schematic diagram of a compensation system according to the invention.

Referring to Fig. 1, an orthogonal system of reference axes $x$, $y$ and $z$ is chosen in such manner that the $x$ axis coincides with the transverse axis of the aircraft, the $y$ axis coincides with the longitudinal axis of the aircraft, and the $z$ axis coincides with the vertical axis intersecting the longitudinal and transverse axes of the aircraft. The direction of the earth's magnetic field is indicated by means of the arrow H, and the angles between the reference axes and the direction of the earth's magnetic field are designated X, Y and Z, respectively.

The total induced magnetic field of the aircraft, though due to a random distribution of magnetic members, may be reproduced by means of three orthogonal ferromagnetic virtual bars of proper dimensions. Conveniently, these virtual bars may be chosen in such fashion that they are parallel respectively to the $x$, $y$ and $z$ axes, these bars being designated the transverse, longitudinal and vertical bars. Each of these bars produces a field in the direction of the axis to which it is parallel, and because the bars do not necessarily lie on the axes, nor are they necessarily symmetrical about the other two axes, each may also produce a field in the direction of the other two axes. For example, it is evident that the field at the intersection of the axes, which is due to a virtual bar chosen parallel to the $x$ axis but probably asymmetrical about the $y$ and $z$ axes as determined by the random magnetic structures of the aircraft, will have components not only along the $x$ axis but also along the $y$ and $z$ axes. Likewise, the field due to virtual bars chosen parallel to the $y$ and $z$ axes but happening to be asymmetrical about the $x$ and $z$ and the $x$ and $y$ axes, respectively, will have components not only along the axis to which the respective bar is parallel but also along the other axes, considering the field set up by the bars at the intersection of the three axes.

For convenience, the fields produced by the bars in the direction of the axes along which they are oriented may be designated TT, VV, etc., where the first letter indicates the direction of the bar causing the field and the second letter indicates the direction of the field caused thereby. Thus TT stands for a transverse bar producing a transverse field, etc. Fields produced by the bars along other axes may be designated TL, VT, etc., where the notation is the same as that used above. The three virtual bars will, therefore, produce a total of nine field components the magnitude of each of which depends upon the relative orientation of the virtual bar causing the field and the earth's magnetic field. These components are indicated in Fig. 1.

The total induced field $\overline{H}_I$ is the vector sum of these nine components and may be expressed in the following manner:

$$\overline{H}_I = H \begin{pmatrix} (TT \cos X - LT \cos Y - VT \cos Z)i \\ (TL \cos X - LL \cos Y - VL \cos Z)j \\ (TV \cos X - LV \cos Y - VV \cos Z)k \end{pmatrix}$$

where $i$, $j$ and $k$ are unit vectors along the $x$, $y$ and $z$ axes, in accordance with usual mathematical notation.

Examination of this equation indicates that in order to achieve compensation, means must be provided for producing opposing fields proportional in magnitude to the magnitude of the earth's magnetic field $H$ multiplied by a constant coefficient TT, TL, VL, etc., and by a trigonometric argument depending upon the orientation of the aircraft in respect to the earth's field.

The present invention provides a system whereby quantities proportional to each term of the above equation may be produced to compensate the total induced magnetic field of the aircraft. Referring to Fig. 2, three magnetometers 10, 12 and 14 are arranged to measure the components of the earth's magnetic field along the $x$, $y$ and $z$ axes, respectively. While these magnetometers may be of any type capable of producing a direct-current output proportional to the magnetic field intensity in a chosen direction, they may conveniently be of the type disclosed in copending application Serial No. 516,612, filed January 1, 1944, Unbalanced Magnetometers, Otto H. Schmitt, and now Patent Number 2,560,132, in accordance with which a set of unbalanced magnetometer elements of the saturated-core type are excited by means of a suitable oscillator and the sensitive energy from the elements is fed to a detector-amplifier giving a direct-current output varying with the intensity of the field along the axis of the magnetometer elements.

Through the use of insensitive magnetometer elements or by other suitable means, the range of linear response of the magnetometer system is increased to an extent such that linear outputs are obtained for all possible values of field intensity along the magnetometer elements.

Coils 52, 54 and 56 are arranged to produce magnetic fields in the direction of $x$, $y$ and $z$ axes respectively. The outputs of magnetometers 10, 12 and 14 are fed into a high-impedance mixer comprising reversing switches 16, 18, 20, 22, 24, 26, 28, 30 and 32 and attenuators 34, 36, 38, 40, 42, 44, 46, 48 and 50, by means of which individual currents of adjustable magnitude and polarity proportional to the output voltages of each of magnetometers 10, 12 and 14 may be fed to each of coils 52, 54 and 56 respectively.

Considering the operation of magnetometers 10, 12 and 14, it will be recognized that the output of magnetometer 10 is proportional to ($H \cos X$), that of magnetometer 12 to ($H \cos Y$), and that of magnetometer 14 to ($H \cos Z$). Accordingly, through appropriate settings of attenuators 34, 40 and 46, and reversing switches 16, 22 and 28, the magnitudes of constants TT, VT, and LT may be adjusted so that all terms due to fields in the direction of the $x$ axis will be compensated.

In a similar fashion, adjustments of attenuators 38, 44 and 50 and the associated reversing switches 20, 26 and 32 vary constants TL, VL, and LL and permit compensation of all terms due to fields in the direction of the $y$ axis; and adjustments of the remaining attenuators 36, 42 and 48 and the reversing switches associated therewith permit variation of constants TV, VV and LV and compensation of terms due to fields in the direction of the $z$ axis. Thus it will be seen that, through appropriate adjustment of the nine reversing switches and the nine attenuators, the above equation may be satisfied for any distribution of magnetic members producing the total induced magnetic field of the aircraft.

In the use of the device, all of the attenuators are initially set in such fashion that no current flows in compensating coils 52, 54 and 56. Then as the aircraft maneuvers, adjustments of the attenuators are made until the total induced field as recorded by suitable measuring instruments is reduced to a minimum, the reversing switches being used where necessary to provide compensating fields of the proper polarity.

What is claimed is:

Apparatus for compensating a magnetically sensitive instrument mounted in an aircraft for the magnetic field induced in the ferromagnetic members in said aircraft, said apparatus comprising three magnetometers each of which includes a coil and a core, said magnetometers being positioned in said aircraft on mutually perpendicular axes, said magnetometers measuring components of the earth's magnetic field along said mutually perpendicular axes and producing voltages proportional to the measured components, a compensating coil mounted on the same axis with each of said magnetometers, and separate circuit means connecting the output from each of said magnetometers to each of said coils, each of said circuit means including a reversing switch and attenuator means.

References Cited in the file of this patent

UNITED STATES PATENTS

| Number | Name | Date |
|---|---|---|
| 41,839 | Gisborne | Mar. 8, 1864 |
| 1,596,639 | Vion | Aug. 17, 1926 |
| 1,672,328 | Loth | June 5, 1928 |
| 1,892,826 | Bettison et al. | Jan. 3, 1933 |
| 2,252,059 | Barth | Aug. 12, 1941 |
| 2,324,718 | Noxon | July 20, 1943 |
| 2,412,617 | Jenkins | Dec. 17, 1946 |
| 2,427,666 | Felch et al. | Sept. 23, 1947 |
| 2,438,964 | Cunningham et al. | Apr. 6, 1948 |

FOREIGN PATENTS

| Number | Country | Date |
|---|---|---|
| 592,801 | Germany | Feb. 15, 1934 |
| 661,594 | Germany | Oct. 24, 1938 |

OTHER REFERENCES

Electricity and Magnetism, by S. G. Starling; Longmans, Green and Co., Ltd., London; 1929; pages 45–50.